(12) United States Patent
Baer et al.

(10) Patent No.: US 7,397,503 B2
(45) Date of Patent: Jul. 8, 2008

(54) SYSTEMS AND METHODS FOR REDUCING ARTIFACTS CAUSED BY ILLUMINANT FLICKER

(75) Inventors: Richard L. Baer, Los Altos, CA (US); Ramakrishna Kakarala, Santa Clara, CA (US)

(73) Assignee: Micron Technology, Inc., Boise, ID (US)

(*) Notice: Subject to any disclaimer, the term of this patent is extended or adjusted under 35 U.S.C. 154(b) by 1100 days.

(21) Appl. No.: 10/629,083

(22) Filed: Jul. 28, 2003

(65) Prior Publication Data
US 2005/0024503 A1 Feb. 3, 2005

(51) Int. Cl.
*H04N 9/73* (2006.01)
*H04N 11/20* (2006.01)

(52) U.S. Cl. .................. 348/226.1; 348/228.1; 348/447

(58) Field of Classification Search .............. 348/226.1, 348/227.1, 228.1
See application file for complete search history.

(56) References Cited

U.S. PATENT DOCUMENTS

| | | | |
|---|---|---|---|
| 4,683,497 A * | 7/1987 | Mehrgardt | 348/447 |
| 6,208,433 B1 | 3/2001 | Iwakawa et al. | |
| 6,256,067 B1 | 7/2001 | Yamada | |
| 6,320,196 B1 | 11/2001 | Dorsel et al. | |
| 6,371,370 B2 | 4/2002 | Sadler et al. | |
| 6,373,995 B1 | 4/2002 | Moore | |
| 6,377,235 B1 * | 4/2002 | Murade et al. | 345/100 |
| 6,441,829 B1 | 8/2002 | Blalock et al. | |
| 6,590,553 B1 * | 7/2003 | Kimura et al. | 345/92 |
| 6,710,818 B1 * | 3/2004 | Kasahara et al. | 348/226.1 |
| 7,106,368 B2 * | 9/2006 | Daiku et al. | 348/226.1 |
| 7,133,075 B2 * | 11/2006 | Ishida et al. | 348/227.1 |
| 7,142,234 B2 * | 11/2006 | Kaplinsky et al. | 348/226.1 |
| 7,209,169 B2 * | 4/2007 | Matsumoto et al. | 348/226.1 |
| 2002/0015101 A1 * | 2/2002 | Mead et al. | 348/333.01 |

FOREIGN PATENT DOCUMENTS

JP 9-104824 4/1997

* cited by examiner

*Primary Examiner*—Nhan T Tran
(74) *Attorney, Agent, or Firm*—RatnerPrestia (57) ABSTRACT

Methods for reducing artifacts caused by illuminant flicker are provided. One such method comprises: providing pixel circuits; and operating the pixel circuits in a bi-directional mode during which first information corresponding to a scene is acquired in forward row-sequential order of the pixel circuits and then second information corresponding to the scene is acquired in a reverse row-sequential order of the pixel circuits. Systems also are provided.

18 Claims, 11 Drawing Sheets

SYSTEMS AND METHODS FOR REDUCING ARTIFACTS CAUSED BY ILLUMINANT FLICKER

BACKGROUND

Image sensors, such as complimentary metal oxide semiconductor (CMOS) image sensors, are used to convert patterns of light imaged thereon into electronic signals representing images. When converting patterns of light, if the color or intensity of an illuminant that provides the light varies with time, undesired artifacts may appear in the images. This kind of variation is known as illuminant flicker.

Many illuminants, including AC-powered fluorescent and tungsten lights, exhibit illuminant flicker. With these illuminants, the intensity varies periodically, i.e., at twice the frequency of the AC power source. With respect to CMOS image sensors, illuminant flicker can cause bands of differing image brightness to appear across the images that are captured.

SUMMARY

Systems and methods for reducing artifacts caused by illuminant flicker are provided. One such method comprises: providing pixel circuits; and operating the pixel circuits in a bi-directional mode during which first information corresponding to a scene is acquired in forward row-sequential order of the pixel circuits and then second information corresponding to the scene is acquired in reverse row-sequential order of the pixel circuits.

Another method comprises: a method for reducing artifacts caused by illuminant flicker; providing pixel circuits; and operating the pixel circuits in a bi-directional mode during which first information corresponding to a scene is acquired in forward row-sequential order of the pixel circuits and then second information corresponding to the scene is acquired in reverse row-sequential order of the pixel circuits.

A system for reducing artifacts caused by illuminant flicker comprises an image sensor comprising an array of pixel circuits arranged in rows, a first of the pixel circuits being located in a first of the rows, a second of the pixel circuits being located in a second of the rows, the first of the pixel circuits being operable to acquire first information corresponding to the scene at a first time, the second of the pixel circuits being operable to acquire second information corresponding to the scene at a second time subsequent to the first time and to acquire third information corresponding to the scene at a third time subsequent to the second time, the first of the pixel circuits being further operable to acquire fourth information corresponding to the scene at a fourth time subsequent to the third time. The image sensor is operable to combine the first information and the fourth information to provide a first output signal corresponding to the first of the pixel circuits, and to combine the second information and the third information to provide a second output signal corresponding to the second of the pixel circuits.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Reference is now made to the following drawings. Note that the components in the drawings are not necessarily to scale.

DETAILED DESCRIPTION

As will be described in detail here, systems and methods for reducing artifacts caused by illuminant flicker involve the use of image sensors. In particular, information corresponding to a scene is acquired by the pixels of such an image sensor, with the pixels sequentially sampling the scene in forward row-sequential order. The scene is then sampled by the pixels in reverse row-sequential order. Thus, with respect to each pixel, two samples of information are acquired, i.e., information acquired during operation in the forward row-sequential order and information acquired during operation in the reverse row-sequential order. The two samples of information for each pixel then are combined to provide an output. Consequently, each pixel provides an output that is less affected by illuminant flicker than each of the samples of information individually.

Figure 1:
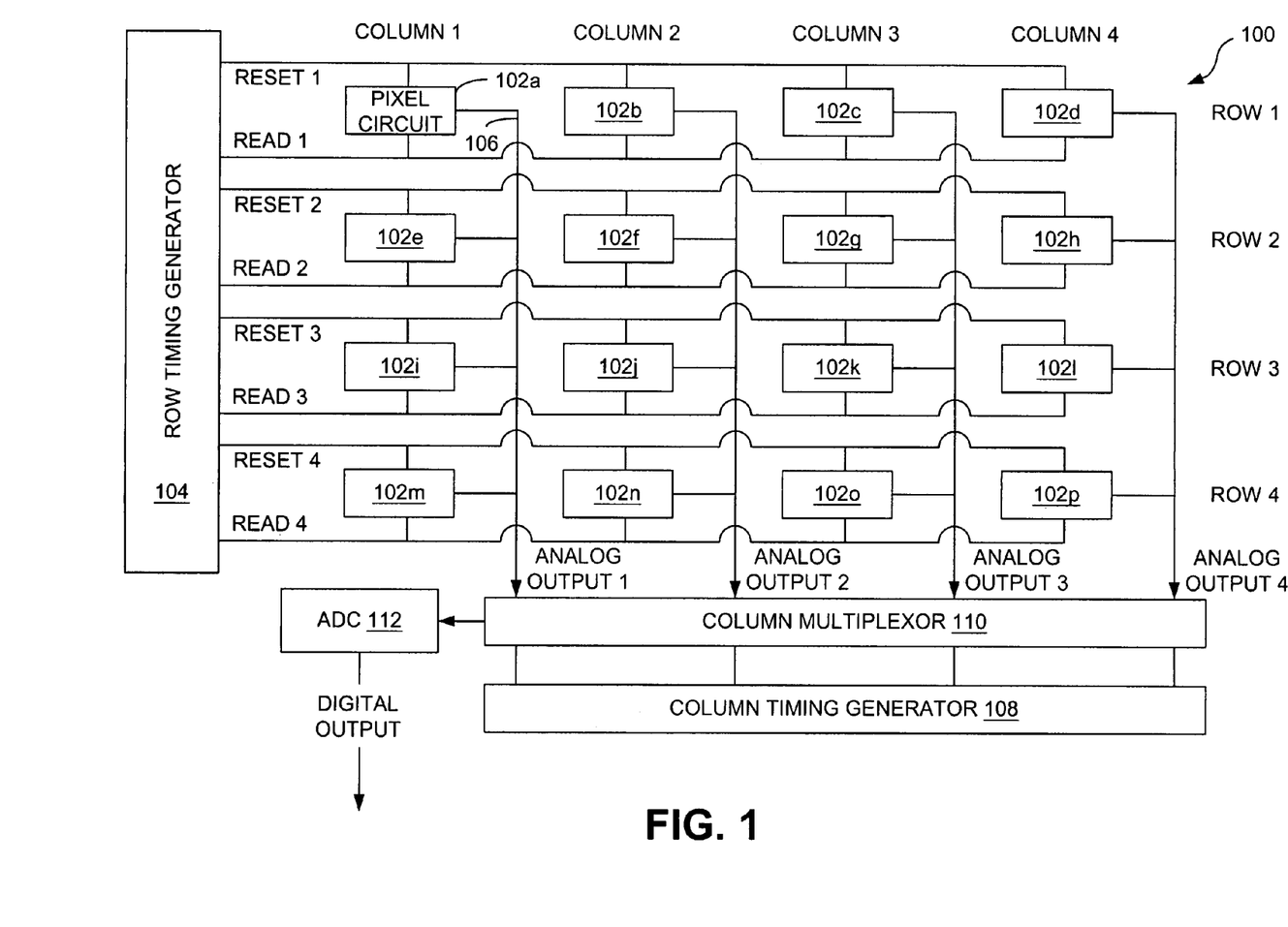
FIG. 1 is a schematic diagram of an embodiment of a system for reducing artifacts caused by illuminant flicker.

Referring now to the drawings, FIG. 1 is a schematic diagram of an embodiment of a system for reducing artifacts caused by illuminant flicker. As shown in FIG. 1, system 100 includes an array of pixels 102a-102p, each of which includes a pixel circuit. The pixels are oriented in a column-and-row arrangement, with each column and each row, respectively, including four of the pixels. A row timing generator 104 provides reset and read signals to the pixels. Specifically, each pixel of a row of pixels is electrically connected to a reset signal line, which is used to provide a reset signal to that row of pixels. For example, pixels 102a-102d of row 1 are electrically connected to reset signal line 1 ("RESET 1"). Each pixel of a row of pixels also is electrically connected to a read line, which is used to provide a read signal to that row of pixels. For example, pixels 102a-102d are electrically connected to read signal line 1 ("READ 1"). Also, all pixels of a column are electrically connected to a column line of that column. For example, pixels 102a, 102e, 102i and 102m are electrically connected to column line 106.

System 10 also includes a column timing generator 108 and a column multiplexor 110. The column timing generator 108 provides signal for controlling the timing of the multiplexor 110. For example, pixels 102a, 102e, 102i and 102m are electrically connected to column multiplexor 110 to analog output line 1 via column line 106. The column multiplexor 110 receives analog output signals from each of the columns of pixels and provides a multiplexed analog output to an optional analog-to-digital converter (ADC) 112 based on the timing provided by the column timing generator 108. ADC 112 receives the multiplexed analog output and then provides digital outputs corresponding to the information acquired by the pixels. Alternatively, analog output can be provided. Note that although a 4×4 array of pixels is depicted in FIG. 1, various other numbers and arrangements of pixels can be used in other embodiments, with the number of pixels typically used being much larger than shown.

In operation, each row of pixels of system 10 is sequentially reset and read, and a corresponding analog output from each pixel of a row is provided to the column multiplexor 110. The column multiplexor 110 then sequentially selects among the analog outputs and provides a multiplexed analog output to the ADC 112. The ADC 112 then provides a corresponding digital output that can be provided to an image processor, for example.

Figure 2:
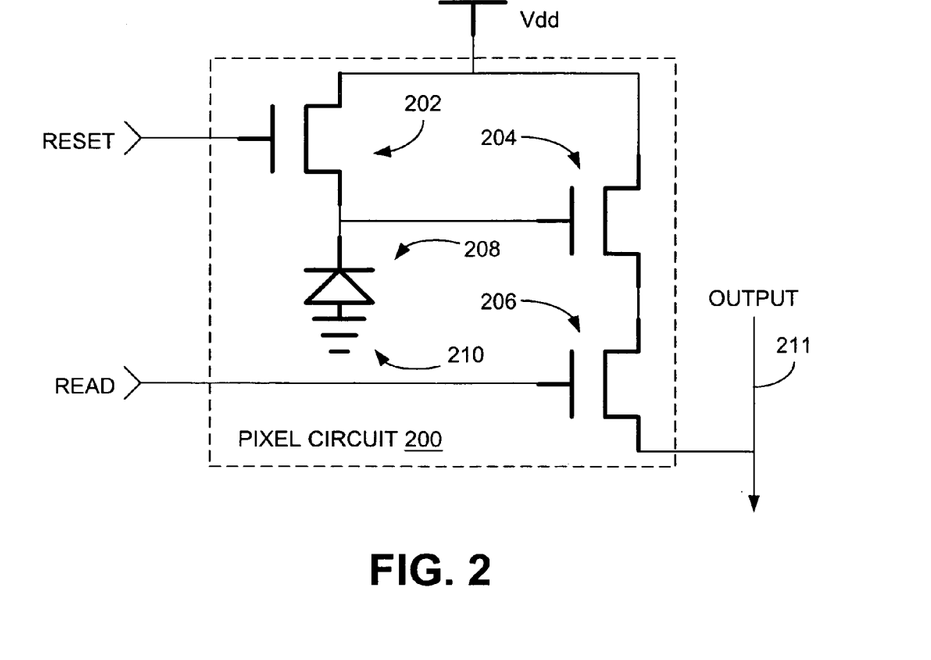
FIG. 2 is a circuit diagram of an embodiment of a pixel circuit that can be used in the system of FIG. 1.

An embodiment of a pixel circuit that can be used in a system for reducing artifacts caused by illuminant flicker is depicted in FIG. 2. As shown in FIG. 2, pixel circuit 200 is a complimentary metal oxide semiconductor (CMOS) circuit that includes three transistors. Specifically, pixel circuit 200 includes a reset transistor 202, a buffer transistor 204 and a row select transistor 206. Such a pixel circuit is generally known as a "3-T pixel circuit." Pixel circuit 200 also includes a photodiode 208 that is electrically connected between reset transistor 202 and ground 210. Reference voltage $V_{dd}$ is electrically coupled to the drain terminals of reset transistor 202 and buffer transistor 204. The gate of buffer transistor 204 is electrically connected to the node between the cathode of photodiode 208 and reset transistor 202. The source of buffer transistor 204 is electrically connected to the drain of row select transistor 206. The source of row select transistor 206 is electrically connected to column line 211 of the column in which the pixel circuit 200 is located. Row select transistor 206 functions as a row select switch. Thus, when multiple pixel circuits are arranged in an array, such as in the image sensor 100 of FIG. 1, the rows are selected by the row select transistors connecting the outputs of their pixels to the respective column lines.

In operation, light incident upon the pixel generates charge in the photodiode 208. The detection cycle of the pixel circuit does not begin, however, until the pixel circuit has been reset by providing a reset signal to the gate of reset transistor 202. Specifically, the reset signal applied to the gate of reset transistor 202 turns the transistor ON, which extracts previously-accumulated charge from the photodiode 208. After reset, the photodiode 208 accumulates charge corresponding to the intensity of light incident thereon and the duration of the exposure period. At the end of the exposure period, the read signal applied to the gate of row select transistor 206 turns that transistor ON, which electrically couples the photodiode 208 to the column line 211, thereby providing, on the column line, an analog output signal corresponding to the intensity of the light that was illuminated in photodiode 208 during the exposure period. Note that the transistor 204 buffers the output of the photodiode 208 to prevent the output line from loading the photodiode and attenuating the output signal. Also note that various types of pixel circuits other than the 3-T pixel of FIG. 2 can be used in other embodiments of systems for reducing artifacts caused by illuminant flicker.

The row timing generator controls the application of the reset and read signals to the transistors of the pixel circuits of the pixel array. As will be described in detail later, the reset and read signals are applied so that pixels acquire image information alternately in a forward row-sequential order of the pixel circuits and a reverse row-sequential order of the pixel circuits. With respect to each of the pixel circuits, image information acquired during the forward row-sequential order is combined with image information acquired during the reverse row-sequential order to form the image information for the pixel circuit in a frame of image data. In some embodiments, a control input is provided to the row timing generator for adjusting the timing of the reset and read signals. Such an embodiment is described below with respect to FIG. 11.

Figure 3:
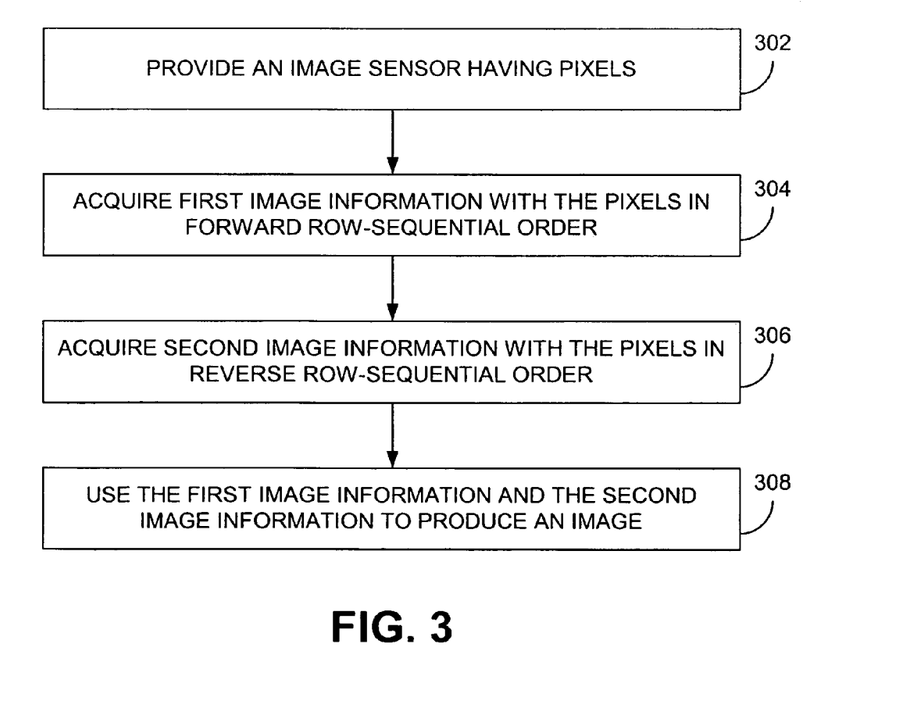
FIG. 3 is a flowchart depicting functionality of an embodiment of a system for reducing artifacts caused by illuminant flicker.

Having described the structure of an embodiment of a system for reducing artifacts caused by illuminant flicker, functionality of that embodiment will be described with reference to the flowchart of FIG. 3. As shown in FIG. 3, the functionality (or method) may be construed as beginning at block 302, where an array of pixel circuits is provided. In block 304, first image information is acquired using the pixel circuits operated in a forward row-sequential order of the pixel circuits. By way of example, in some embodiments, the first image information is acquired sequentially on a row-by-row basis starting from the top row of the pixel circuits. In block 306, second image information is acquired using the pixel circuits operated in a reverse row-sequential order. Thus, continuing with the previous example, second image information is acquired from the pixel circuits on the row-by-row basis starting from the bottom row of the pixel circuits. Then, as depicted in block 308, the first image information and the second image information are used to produce image data with reduced flicker artifacts. Specifically, the first image information and second image information are combined, i.e., added, so that flicker artifact, which is attributed to an illuminant used with the pixel circuits for acquiring the image information, is reduced.

Figure 4:
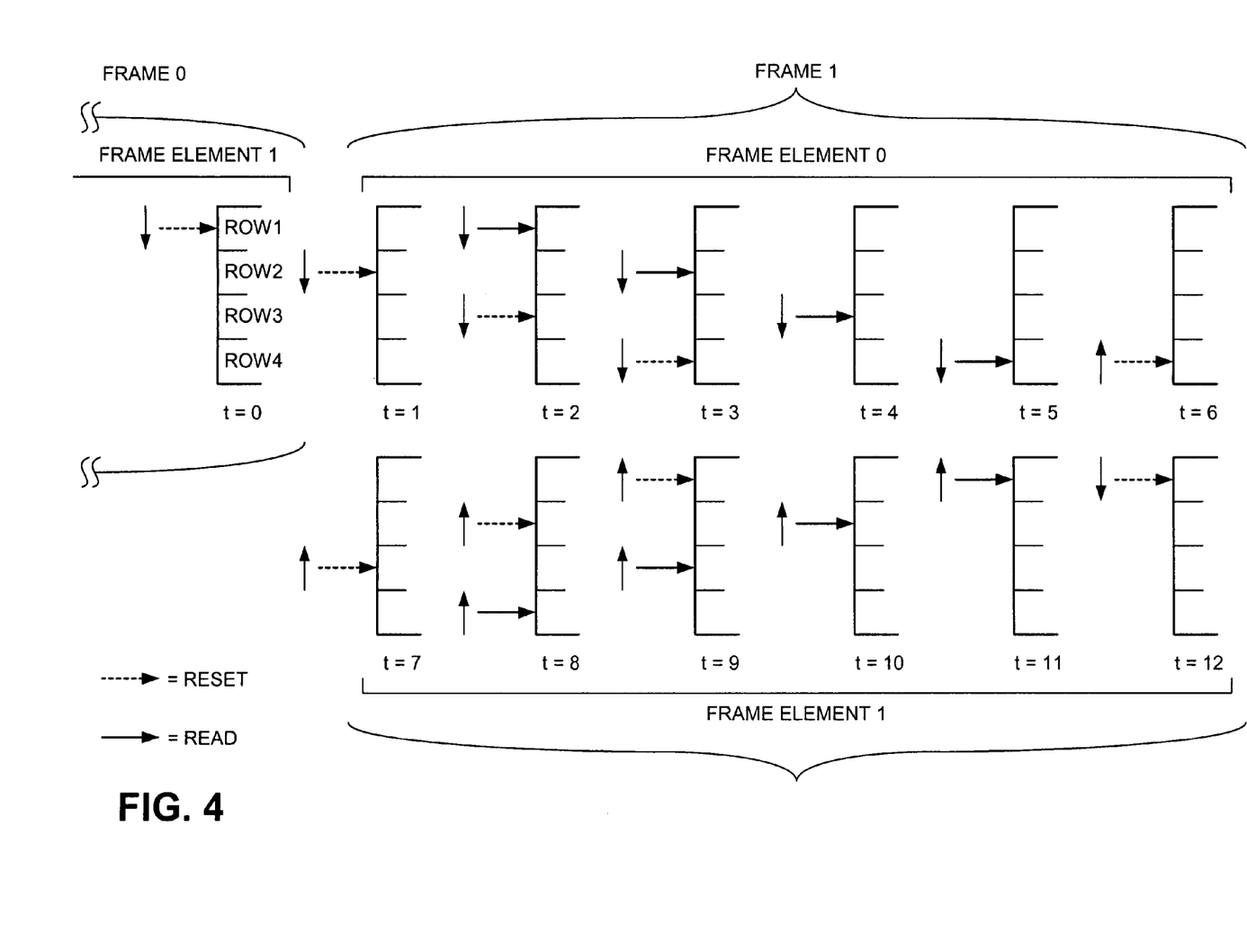
FIG. 4 is a schematic diagram depicting operation of an embodiment of a system for reducing artifacts caused by illuminant flicker.

FIG. 4 is a schematic diagram that depicts operation of the embodiment of the system for reducing artifacts caused by illuminant flicker depicted in FIG. 1. Specifically, FIG. 4 depicts reset and read operations proceeding in a forward direction then in and a reverse direction across the rows of pixel circuits of that system.

As depicted in FIG. 4, during frame element (F. E.) 1 of frame 0, a reset signal is provided to the pixel circuits of row 1, i.e., the reset signal is provided at time t=0. During frame element 0 of frame 1, which includes times t=1 to t=6, each successive row of pixel circuits is reset and then read. Specifically, at time t=1, the pixel circuits of row 2 are reset. At time t=2, pixel circuits of row 3 are reset and pixel circuits of row 1 are read. At time t=3, pixel circuits of row 4 are reset and pixel circuits of row 2 are read. At time t=4, pixel circuits of row 3 are read and, at time t=5, pixel circuits of row 4 are read. Note that during the last time interval of frame 1, i.e., t=6, the pixel circuits of row 4 are reset again.

Proceeding to the times t=7 to t=12 of frame element 1 of frame 1, the reset and subsequent read operations occur in the reverse order of that occurring at times t=1 to t=5 of frame element 0 of frame 1. Specifically, at time t=7, pixel circuits of row 3 are reset. At time t=8, pixel circuits of row 2 are reset and pixel circuits of row 4 are read. At time t=9, pixel circuits of row 1 are reset and pixel circuits of row 3 are read. At time t=10, pixel circuits of row 2 are read and, at time t=11, pixel circuits of row 1 are read. Then, at time t=12, the pixel circuits of row 1 are reset, with the process then repeating the operation at a subsequent t=1 of another frame. Thus, the reset and read operation advances forwards and reverse across the rows of pixel circuits in a bi-directional mode. This is in contrast to the conventional way, in which the reset and read operations advance in a uni-directional mode across the rows of pixel circuits. In the uni-directional mode, once all of the rows have been reset and subsequently read, the reset signal is applied once again to the first row of pixel circuits and the process repeats.

In order for the combined image information to exhibit reduced flicker artifact, the point of symmetry of the illuminant waveform associated with the illuminant is identified. The point of symmetry divides the illuminant waveform into a first portion of the waveform that generally exhibits symmetry about an arbitrary illumination level with respect to the second portion of the illuminant waveform. The reset and read operations of the pixel circuits are then adjusted so that the first image information is acquired from the pixel circuits on the row-by-row basis during a period corresponding to the first portion of the illuminant waveform, and the second image information is acquired during a period corresponding to the second portion of the waveform.

As can be seen in FIG. 4, two samples of information are provided for each frame by each of the pixel circuits, i.e., each pixel circuit provides information when its corresponding row is read during frame element 0 and then again during frame element 1. For example, each pixel circuit of row 1 provides first image information at time t=2 and provides second image information at time t=11. As will be described in greater detail below, the first image information of a pixel circuit is combined with the second image information of that pixel circuit to provide an output that exhibits reduced artifacts caused by illuminant flicker.

Figure 5:
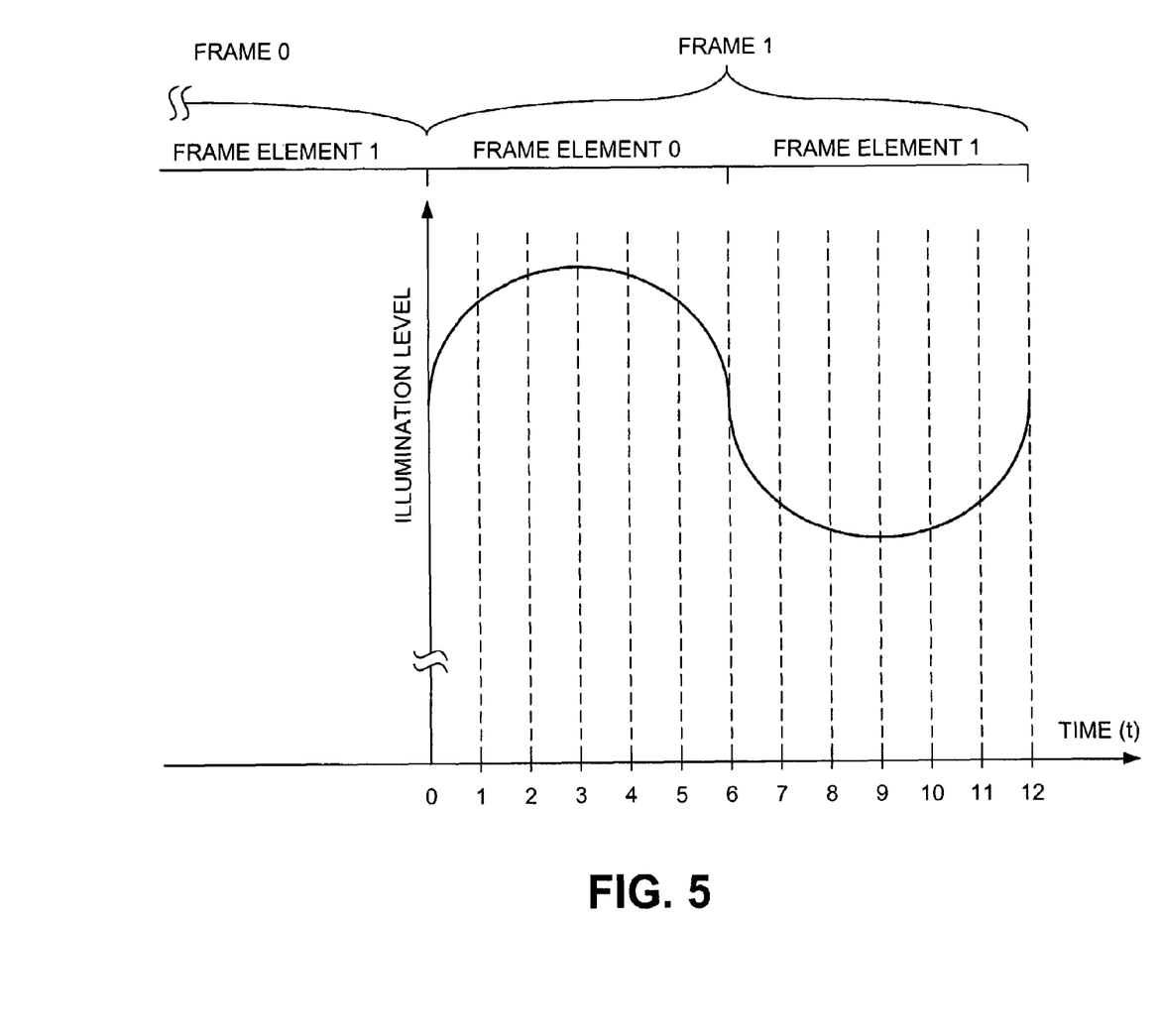
FIG. 5 is a graph depicting intensity versus time for an illuminant associated with the system of FIG. 4.

An illumination waveform of an illuminant that exhibits flicker is depicted in the graph of FIG. 5. Specifically, the graph depicts the intensity of light provided by an illuminant plotted against time. As mentioned before, the flicker of the illuminant is attributable to the illuminant being powered by an AC source. Note that the graph of FIG. 5 also is annotated with the times corresponding to the times of FIG. 4. Specifically, two frame elements of the timing sequence are depicted.

Figure 6:
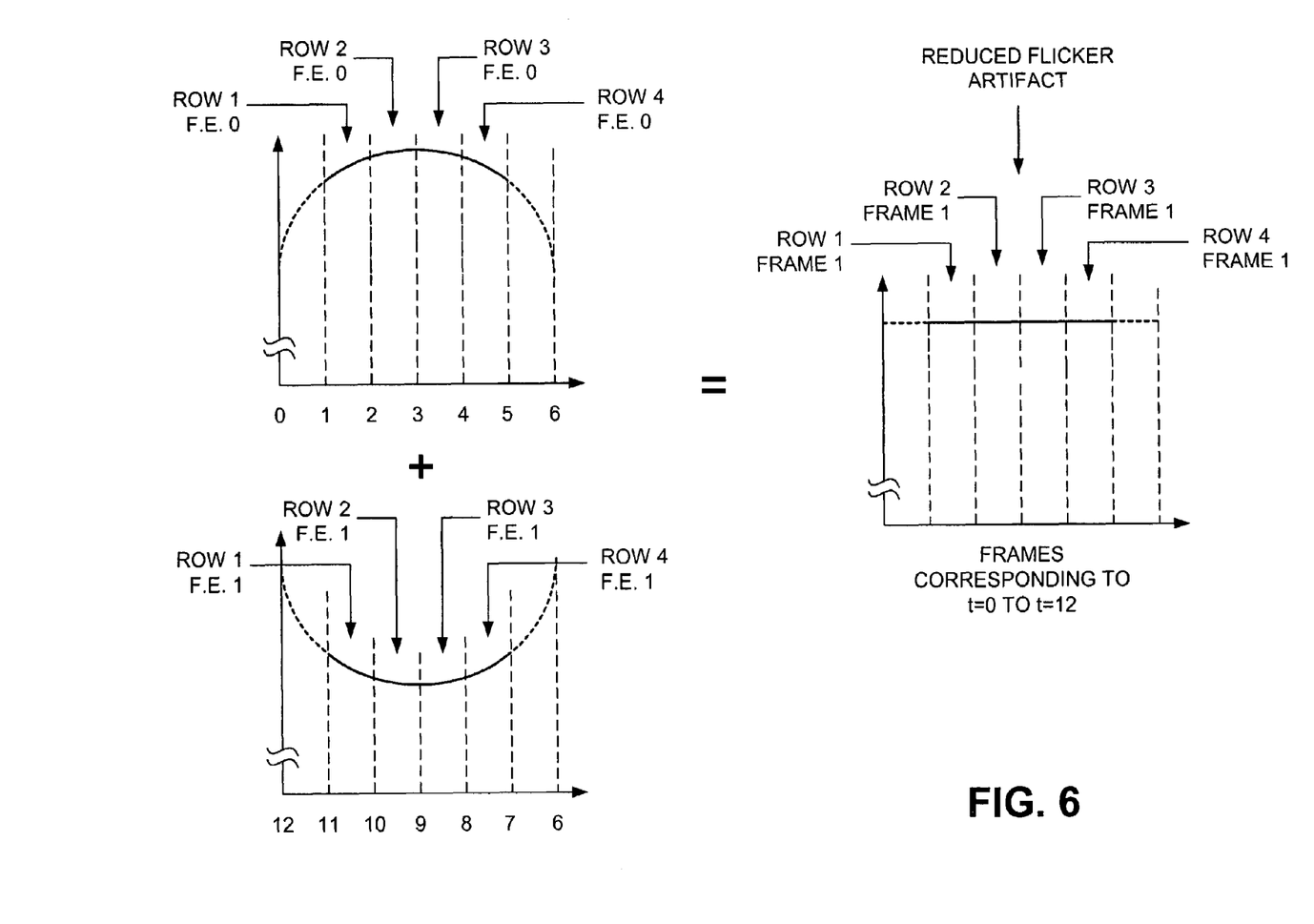
FIG. 6 is a schematic diagram depicting information acquired during the operation shown in FIG. 4, in response to the illuminant waveform depicted in FIG. 5.

Referring now to FIG. 6, the illumination waveform of FIG. 5 is divided into portions, one of which corresponds to the acquisition of information by the image sensor during frame element 0, and the other of which corresponds to the acquisition of information by the image sensor during frame element 1. Note, the solid-lined portion of the waveform indicates time intervals during which image information was read from the pixel circuits. The dashed-lined portions of the waveform at the beginning and end of each frame element correspond to those time intervals during which no pixel circuits were being read.

As shown in FIG. 6, by resetting and reading the rows of pixel circuits in the bi-directional mode described above, the illumination waveform acquired during frame element 1 is temporally reversed compared to the illumination waveform acquired during frame element 0. Then, by combining the information from the image sensor that was captured during frame element 0 with the information captured by the image sensor during frame element 1, the effect of flicker can be reduced as depicted by the output signal shown at the right side of FIG. 6.

Figure 7:
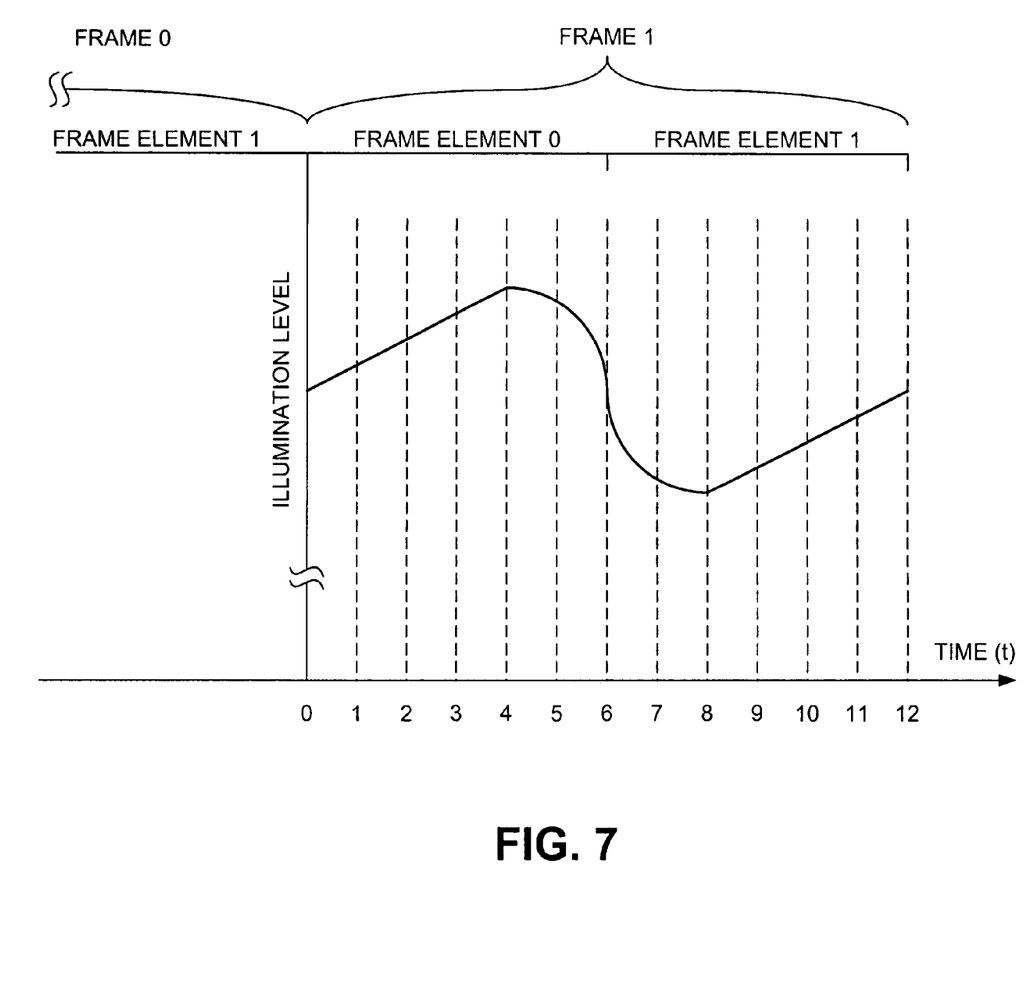
FIG. 7 is a graph depicting intensity versus time for another illuminant.
Figure 8:
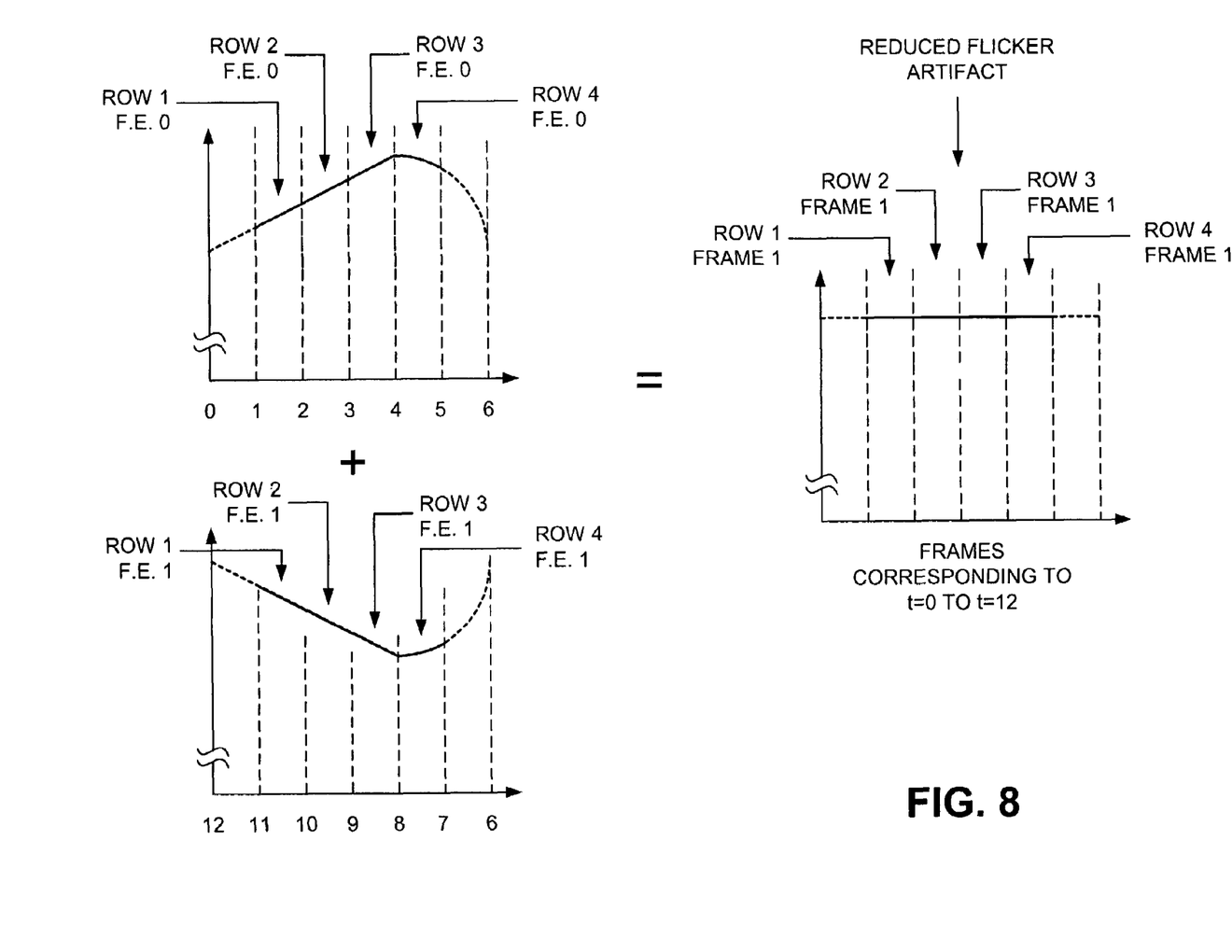
FIG. 8 is a schematic diagram depicting information acquired during the operation shown in FIG. 4, in response to the illuminant waveform depicted in FIG. 7.

In FIG. 8, the illumination waveform of FIG. 7 is divided into portions, one of which corresponds to the acquisition of information by the image sensor during frame element 0, and the other of which corresponds to the acquisition of information by the image sensor during frame element 1. Note, as before, the solid-lined portion of the waveform indicates time intervals during which image information was read from the pixel circuits, and the dashed-lined portions of each frame correspond to those time intervals during which no pixel circuits were being read.

As shown in FIG. 8, the illumination waveform acquired during frame element 1 is temporally reversed compared to the illumination waveform acquired during frame element 0. Combining the information from the image sensor that was captured during frame element 0 with the information captured by the image sensor during frame element 1 reduces the effect of flicker as depicted by the output signal shown at the right side of FIG. 8.

In order for the output signal to exhibit reduced artifacts of illuminant flicker, such as depicted in FIG. 8, the timing of the reset and read operations of the pixel circuits of the image sensor are established to correspond to the waveform of the illuminant. Specifically, the timing should be adjusted so that frame element 0 of the image sensor corresponds to a first portion of a cycle of the waveform, and frame element 1 of the image sensor corresponds to a second portion of the cycle, with demarcation of the first and second portions occurring at the location of symmetry of the waveform about an arbitrary illumination level.

Figure 9:
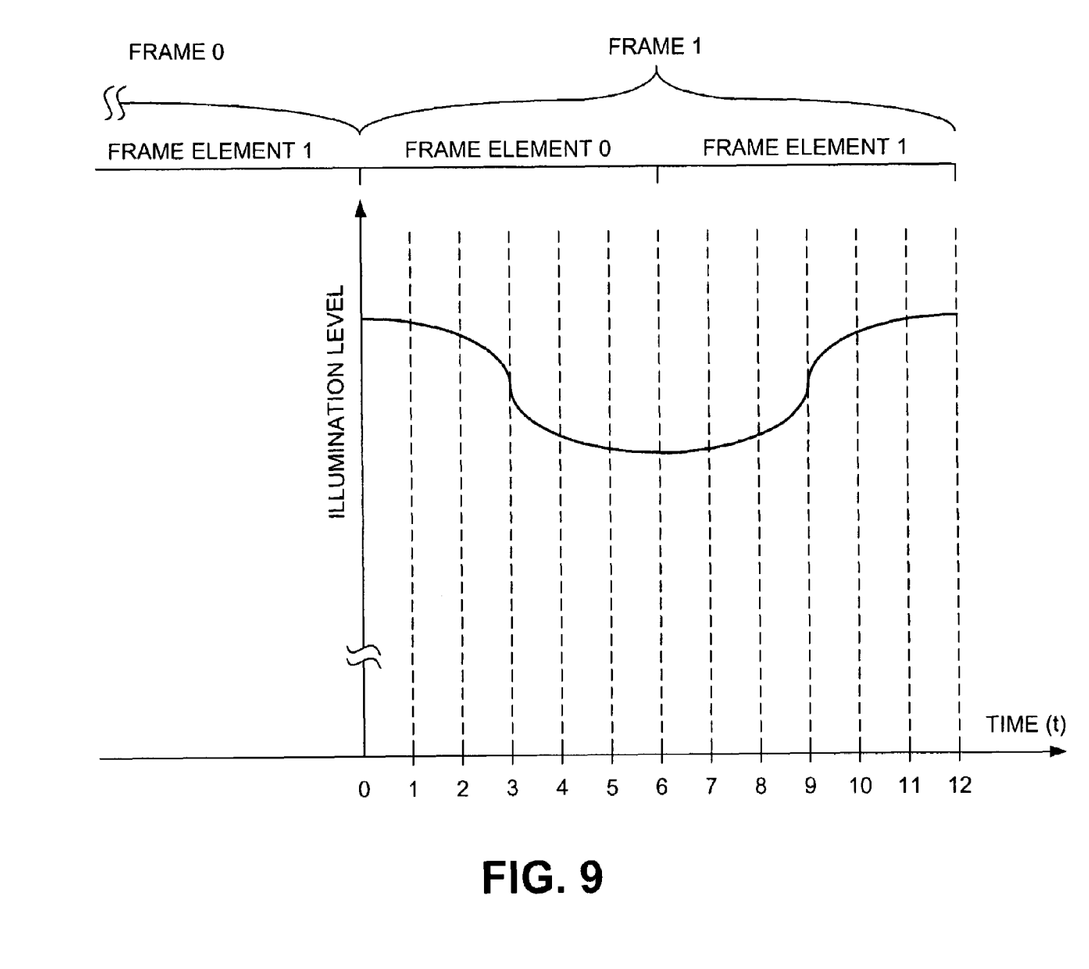
FIG. 9 is a graph depicting intensity versus time for another illuminant.
Figure 10:
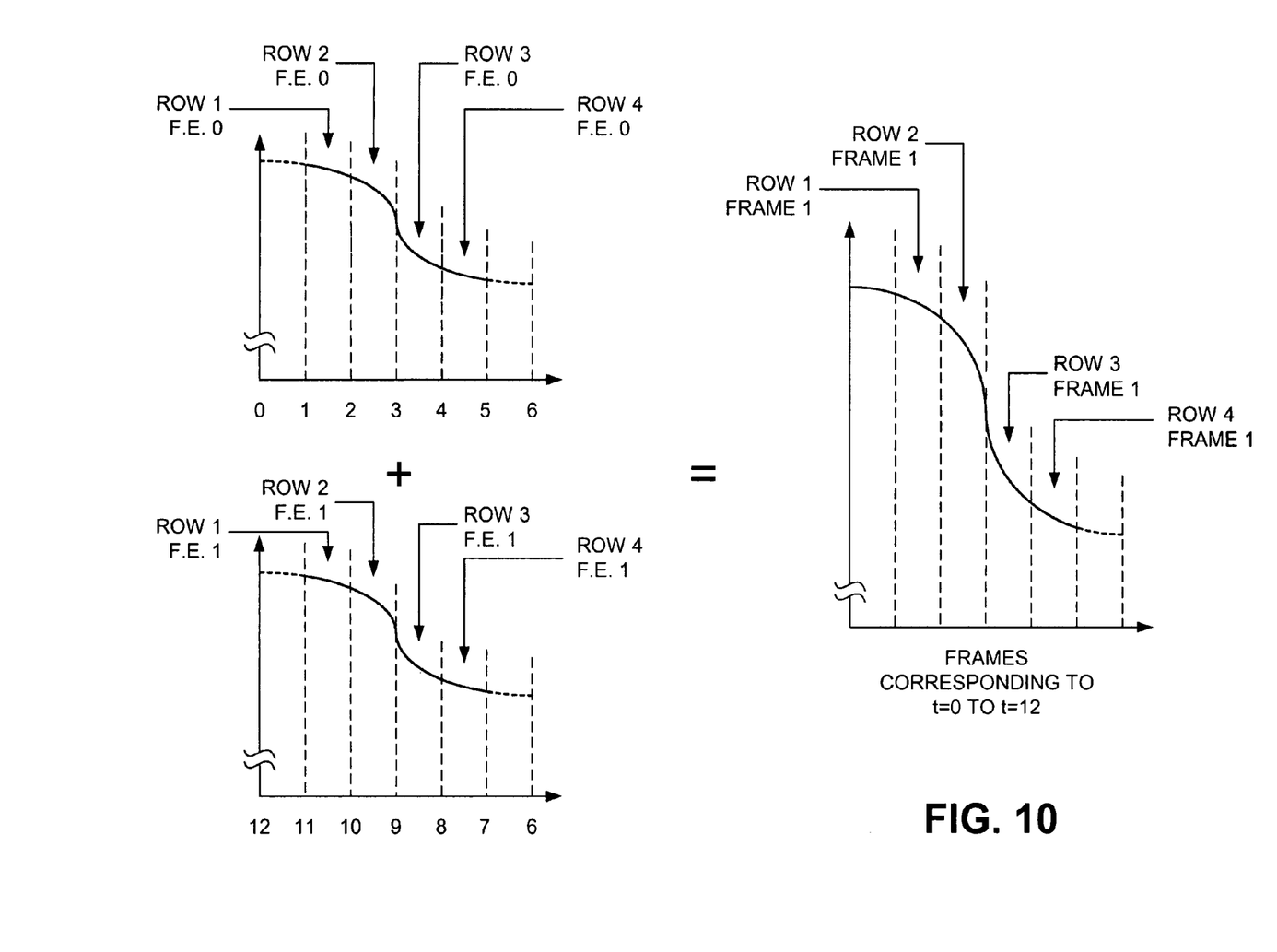
FIG. 10 is a schematic diagram depicting information acquired during the operation shown in FIG. 4, in response to the illuminant waveform depicted in FIG. 9.

As shown in FIG. 9, another example illumination waveform is depicted that exhibits symmetry about an arbitrary illumination level. However, as shown in FIG. 10, the effect of flicker on the output signal has been increased compared to the information acquired by the pixel circuits. This is because the timing of the reset and read operations of the pixel circuits have not been aligned with the waveform of the illuminant as described above. In particular, the timing is not adjusted so that frame element 0 corresponds to a first portion of a cycle of the waveform that is located on one side of the location of symmetry, and so that frame element 1 corresponds to a second portion of the cycle that is located on the other side of the location of symmetry.

The synchronizing of the timing of an image sensor to the frequency of an illuminant can be accomplished using knowledge of the characteristics of the illuminant waveform. For example, if the illuminant is known to have a flicker period of 120 Hz, and the image sensor has 480 rows of pixel circuits, the time interval between resetting (and also reading) adjacent rows of the pixel circuits could be set at 17.36 µsec (1/(flicker frequency*number of rows)) when operating in a uni-directional mode. When operating in a bi-directional mode, with an exposure period of 2 row periods, the time interval could be set to 17.29 µsec (1/(flicker frequency* (number of rows+exposure period in number of rows))). Note that the reset and read operation should also be aligned with the illuminant waveform as described previously.

In some embodiments, however, synchronizing of the timing of an image sensor to the waveform of an illuminant can be accomplished dynamically. In this regard, an example of another embodiment of a system for reducing artifacts caused by illuminant flicker will now be described.

Figure 11:
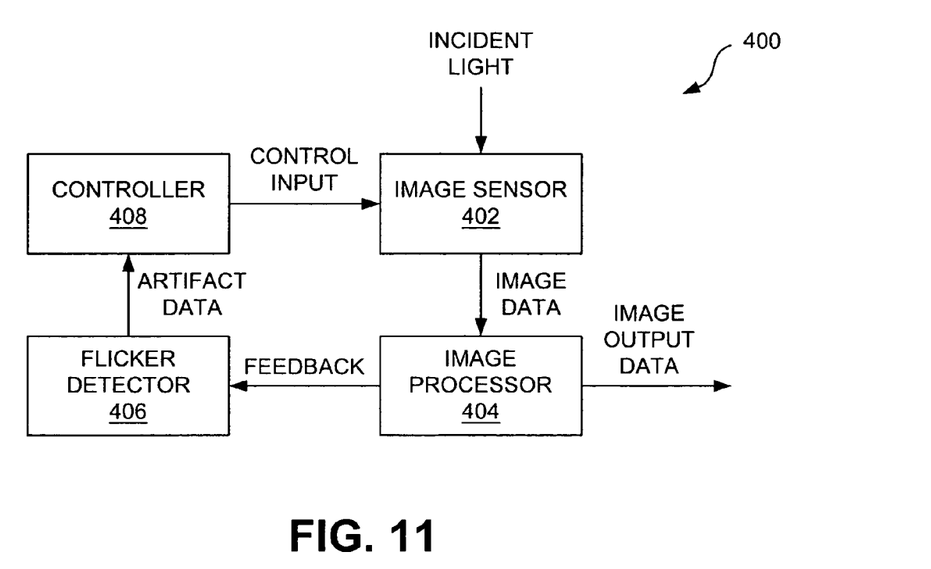
FIG. 11 is a schematic diagram depicting another embodiment of a system for reducing artifacts caused by illuminant flicker.

As shown in FIG. 11, system 400 includes an image sensor 402 that incorporates an array of pixel circuits (not shown). The image sensor acquires image information corresponding to a scene and provides image data as an output. The image sensor provides the image data to an image processor 404, which combines the acquired information in accordance with a designated technique, such as the bi-directional mode described above. For instance, when operating in the bi-directional mode, the image processor receives first information and second information corresponding to each of the pixel circuits of the image sensor and combines the first and second information to produce image output data.

The image processor 404 provides the image output data, which can be used to drive a display device or can be stored in a memory storage device, for example. The image processor 404 also provides a feedback output to a flicker detector 406, which analyzes the feedback output to determine the existence and/or degree of flicker artifact in the feedback output. The flicker detector 406 can use a technique such as Fourier analysis to detect the magnitude of the signal at the flicker frequency. By comparing samples of the feedback output, a determination can be made as to whether flicker artifact has been minimized. Note, the feedback output may be identical to the image output data.

The flicker detector 406 then provides artifact data to a controller 408, with the artifact data being indicative of whether the flicker is increasing or decreasing. The controller 408 provides a control input to the image sensor 402, e.g., to the row-timing generator, for controlling the timing of various operations, such as timing of reset and read operations. Typically, the controller adjusts the operation of the image sensor using the control input until the flicker is minimized. This can include increasing and/or decreasing the time interval between resets, increasing and/or decreasing the time interval between reads, and adjusting the onset of the reset and read process with respect to the illuminant waveform. Note, each of the image processor 404, the flicker detector 406 and the controller 408 can be implemented in hardware, software or combinations thereof.

Additionally or alternatively, embodiments of controllers can change the modes of operation of associated image sensors. In particular, some controllers can enable associated image sensors to operate selectively in bi-directional modes, in which the reset and read operations sweep back and forth across the rows of pixel circuits, and in uni-directional modes, in which the reset and read operations sweep only in one direction across the rows of pixel circuits. Note that use of the uni-directional mode may be preferred if the illuminant waveform does not exhibit symmetry about an arbitrary illumination level, since use of the bi-directional mode may exhibit a negligible reduction in flicker or, in some cases, may increase its effects. Functionality of an embodiment of a system for reducing artifacts caused by illuminant flicker that can selectively operate in each of a bi-directional mode and a uni-directional mode will now be described with reference to the flowchart of FIG. 12.

Figure 12:
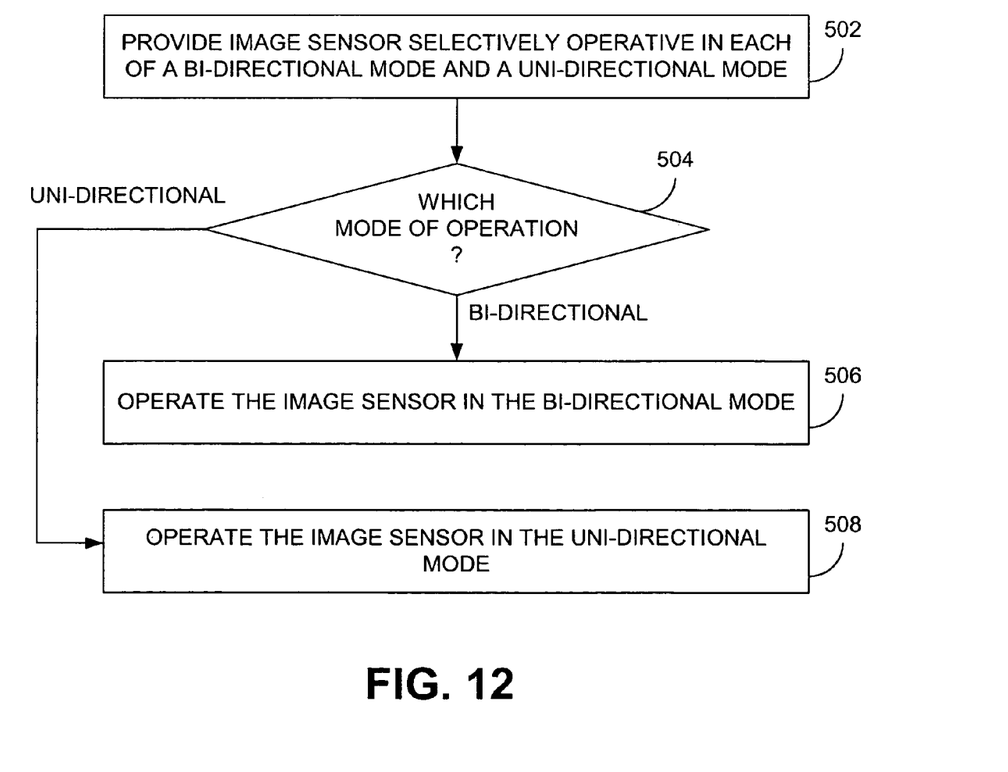
FIG. 12 is a flowchart depicting functionality of the system of FIG. 11.

As shown in FIG. 12, the functionality (or method) may be construed as beginning at block 502, where an image sensor that is selectively operable in each of a bi-directional mode and a uni-directional mode is provided. In block 504, a determination is made as to whether the image sensor is to operate in a bi-directional mode or a uni-directional mode. If it is determined in block 504 that the image sensor is to operate in the bi-directional mode, the process proceeds to block 506 where the image sensor is operated in a the bi-directional mode. Note, this may include aligning a detection cycle of the image sensor with an illumination cycle of a corresponding illuminant, as previously described, in order to ensure that flicker is minimized. When, however, it is determined that the image sensor is not to operate in the bi-directional mode, the process proceeds to block 508, where the image sensor is operated in the uni-directional mode. The uni-directional mode of operation will now be described with respect to FIG. 13.

Figure 13:
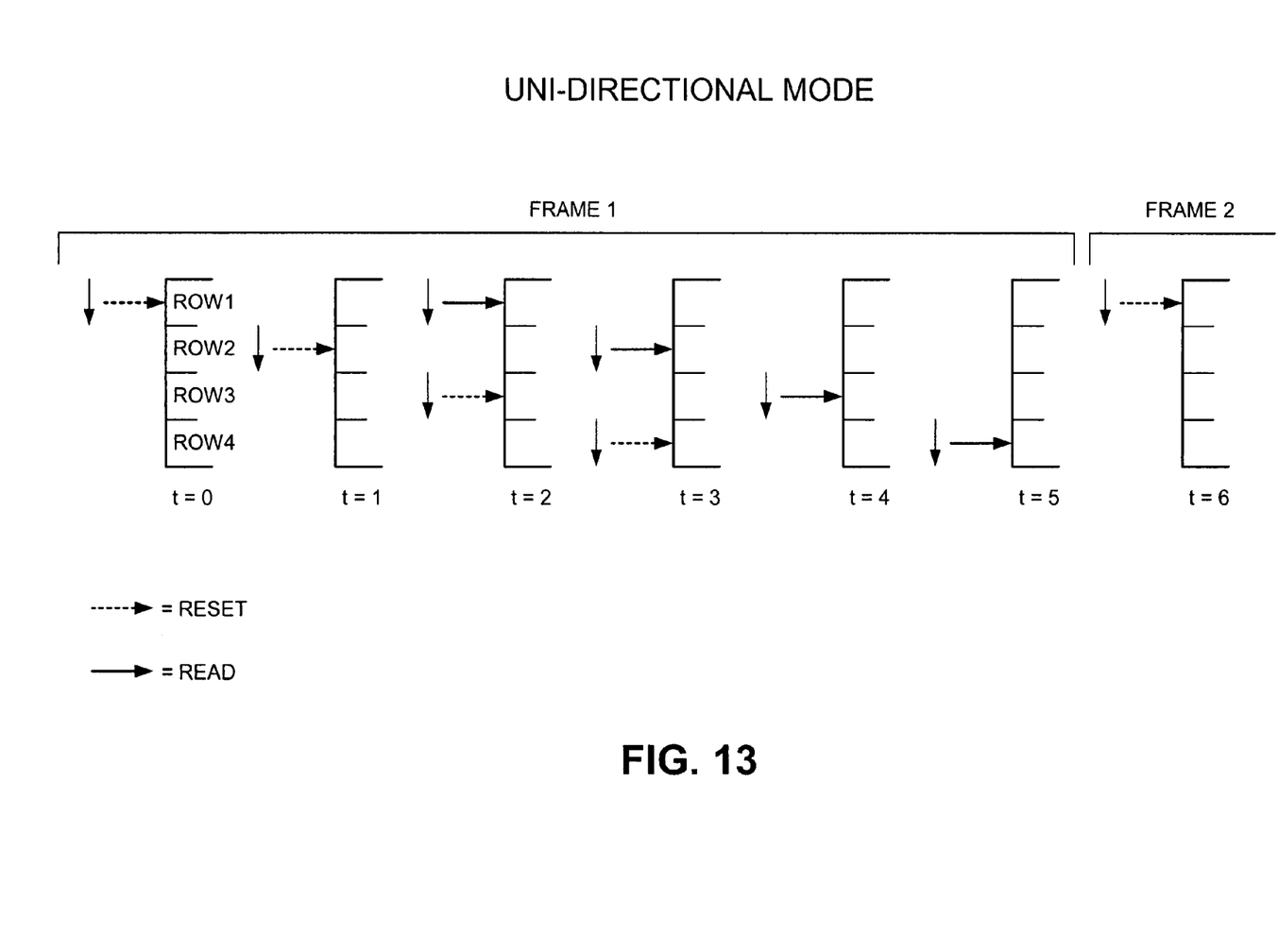
FIG. 13 is a schematic diagram depicting operation of an embodiment of a system for reducing artifacts caused by illuminant flicker that is operating in a rolling shutter mode.

FIG. 13 is a schematic diagram that depicts operation of an embodiment of a system for reducing artifacts caused by illuminant flicker that is operating in a uni-directional mode. Note that, similar to the description accompanying FIG. 4, the image sensor is assumed to include only four rows of pixel circuits for ease of description.

As depicted in FIG. 13, each successive row of pixel circuits is reset and then read during frame 1, which includes times t=0 to t=5. Specifically, at time t=0, the pixel circuits of row 1 are reset. At time t=1, the pixel circuits of row 2 are reset. At time t=2, pixel circuits of row 3 are reset and pixel circuits of row 1 are read. At time t=3, pixel circuits of row 4 are reset and pixel circuits of row 2 are read. At time t=4, pixel circuits of row 3 are read and, at time t=5, pixel circuits of row 4 are read.

The above-described process repeats every frame, beginning with reset of the pixel circuits of row 1 and ending with read of the pixel circuits of row 4. Thus, the reset and read operations advance in one direction among the rows of pixel circuits.

It should be emphasized that many variations and modifications may be made to the above-described embodiments. For example, the functionality associated with the blocks of one or more of the flowcharts of this disclosure may occur out of the order in which depicted. All such modifications and variations are intended to be included herein within the scope of this disclosure and protected by the following claims.

The invention claimed is:

1. A system for reducing artifacts caused by illuminant flicker, said system comprising:

an image sensor comprising an array of pixel circuits arranged in rows, a first of the pixel circuits being located in a first of the rows, a second of the pixel circuits being located in a second of the rows, the first of the pixel circuits being operable to acquire first information corresponding to the scene at a first time, the second of the pixel circuits being operable to acquire second information corresponding to the scene at a second time subsequent to the first time and to acquire third information corresponding to the scene at a third time subsequent to the second time, the first of the pixel circuits being further operable to acquire fourth information corresponding to the scene at a fourth time subsequent to the third time;

the image sensor being operable to combine the first information and the fourth information to provide a first output signal corresponding to the first of the pixel circuits, and to combine the second information and the third information to provide a second output signal corresponding to the second of the pixel circuits.

2. The system of claim 1, wherein the first of the rows of pixel circuits is located adjacent to the second of the rows of pixel circuits.

3. The system of claim 1 further comprising:

a controller operable to provide an input signal to the image sensor to set timing of a reset and read operations of the rows of pixel circuits; and flicker detector operable to provide the controller with a signal corresponding to detected amount of flicker artifact acquired by the array.

4. A system for reducing artifacts caused by illuminant flicker, said system comprising:

an array of pixel circuits operable in a bi-directional mode during which the array acquires first information corresponding to a scene in forward row-sequential order of the pixel circuits and then acquires second information corresponding to the scene in reverse row-sequential order of the pixel circuits; and an image processor operable to receive the first information and the second information and to combine the first information and the second information to provide an output signal corresponding to the scene.

5. The system of claim 4, wherein at least one of the pixel circuits comprises a complimentary metal oxide semiconductor (CMOS) pixel circuit.

6. The system of claim 5, wherein the at least one of the pixel circuits comprises a 3 T pixel circuit.

7. The system of claim 4, wherein the array of pixel circuits has a detection cycle having a duration corresponding to a duration of the flicker cycle of the illuminant.

8. The system of claim 7, wherein the detection cycle is temporally aligned with the flicker cycle of the illuminant.

9. The system of claim 4, wherein the array of pixel circuits is further operable in a uni-directional mode during which the array acquires information corresponding to the scene only in the forward row-sequential order of the pixel circuits.

10. The system of claim 9, further comprising:
a controller operable to provide an input signal to the array of pixel circuits, the input signal selectively causing the array to operate in either the bi-directional mode or the unidirectional mode.

11. The system of claim 9, further comprising:
means for selectively causing the array to operate in either the bi-directional mode or the uni-directional mode.

12. The system of claim 10, further comprising:
a flicker detector communicating with the controller and operable to provide the controller with a signal corresponding to a detected amount of flicker artifact acquired by the array.

13. A method for reducing artifacts caused by illuminant flicker captured by an image reception device having pixel circuits, said method comprising:
capturing a plurality of images by operating the pixel circuits in the image reception device in a bi-directional mode during which first information corresponding to a scene is acquired in forward row-sequential order of the pixel circuits and then second information corresponding to the scene is acquired in reverse row-sequential order of the pixel circuits; and
detecting, by a flicker detector, flicker artifacts in the plurality of captured images;
outputting, by the flicker detector, a flicker signal indicative of an increase or a decrease of the illuminant flicker in each subsequently captured image; and
controlling a timing of a detection cycle of the pixel circuits to decrease flicker in each subsequently captured image.

14. The method of claim 13, further comprising:
combining the first information and the second information to form frames of image information corresponding to the pixel circuits.

15. The method of claim 13, wherein a duration of a detection cycle of the pixel circuits corresponds to acquisition of the first information and acquisition of the second information; and further comprising:
aligning the detection cycle with a flicker cycle of the illuminant.

16. A method for reducing, in pixel circuits, artifacts caused by illuminant flicker by an illuminant exhibiting an illuminant waveform defining a flicker cycle, said method comprising:
operating the pixel circuits in a bi-directional mode during which first information corresponding to a scene is acquired in forward row-sequential order of the pixel circuits and then second information corresponding to the scene is acquired in reverse row-sequential order of the pixel circuit such that a duration of a detection cycle of the pixel circuits corresponds to acquisition of the first information and acquisition of the second information;
aligning the detection cycle with the flicker cycle of the illuminant;
and
wherein, in aligning the detection cycle, a first time period during which the first information is acquired corresponds to a first portion of the illuminant waveform, and a second time period during which the second information is acquired corresponds to a second portion of the illuminant waveform, demarcation of the first portion and the second portion of the illuminant waveform occurring at a location of symmetry of the illuminant waveform about an arbitrary illumination level.

17. The method of claim 16, further comprising:
detecting flicker artifact in the information acquired; and
adjusting the duration of the detection cycle of the pixel circuits to reduce the flicker artifact in subsequently acquired information.

18. The method of claim 16, further comprising:
selectively operating the pixel in either the bi-directional mode or a uni-directional mode, during which information corresponding to the scene is only acquired in the forward row-sequential order of the pixel circuits.

* * * * *

UNITED STATES PATENT AND TRADEMARK OFFICE
CERTIFICATE OF CORRECTION

PATENT NO. : 7,397,503 B2  Page 1 of 1
APPLICATION NO. : 10/629083
DATED : July 8, 2008
INVENTOR(S) : Baer et al.

It is certified that error appears in the above-identified patent and that said Letters Patent is hereby corrected as shown below:

In column 8, line 59, in Claim 3, after "timing of" delete "a".

In column 8, line 62, in Claim 3, after "to" insert -- a --.

Signed and Sealed this

Sixteenth Day of September, 2008

JON W. DUDAS
*Director of the United States Patent and Trademark Office*